Patented June 2, 1936

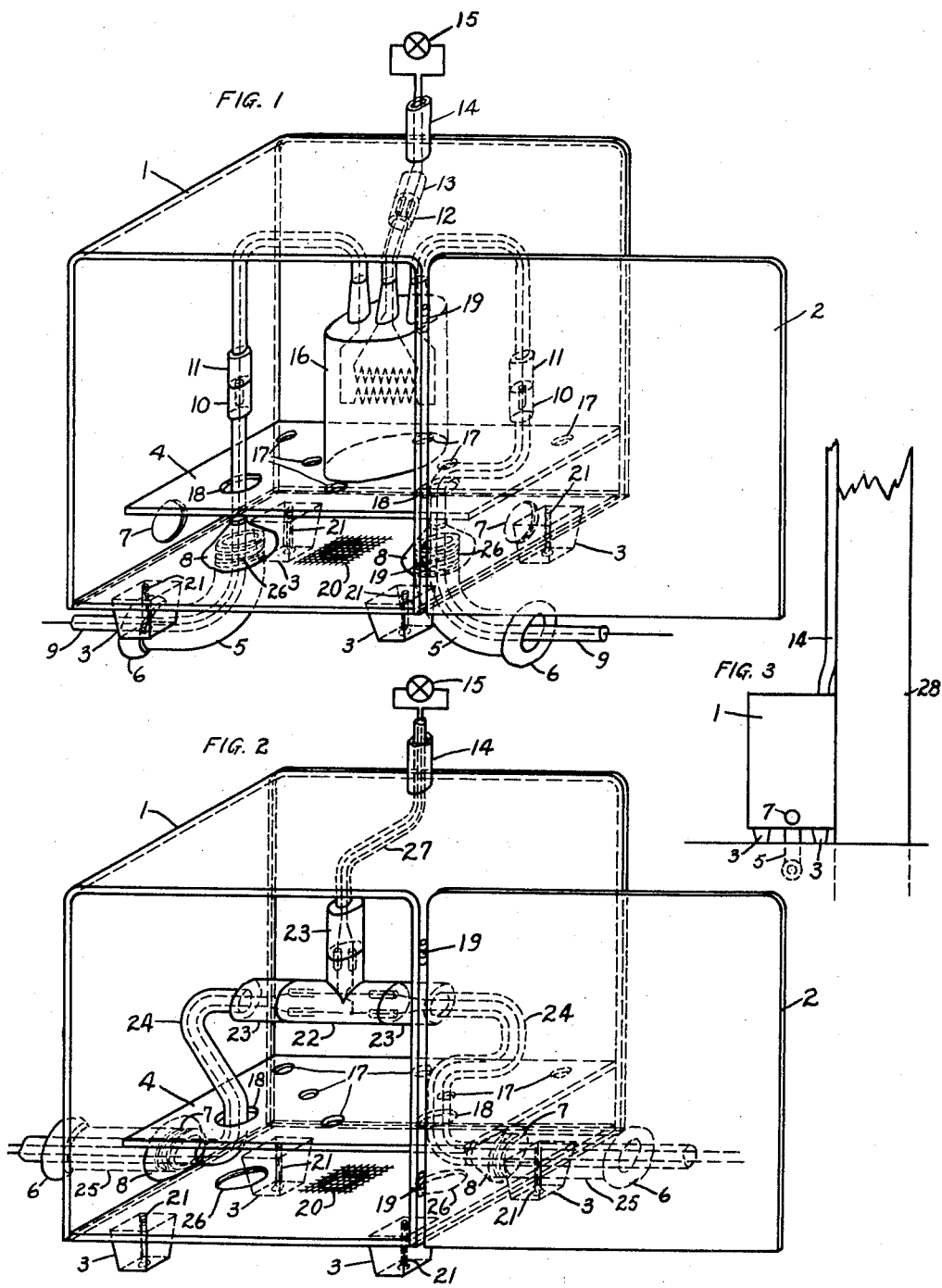

2,043,180

UNITED STATES PATENT OFFICE 2,043,180

SAFETY COIL BOX

Victor A. La Fave, Rantoul, Ill.

Application January 31, 1935, Serial No. 4,331

2 Claims. (Cl. 247—1)

This invention relates to the class of electricity and pertains particularly to improvements in equipment of the nature of junction boxes.

In the present electrical systems used in park areas, airports or other outdoor places where lighting is employed, the current carrying cables through which current is distributed to various pieces of electrical equipment such as floodlights, beacon lights or the like, is buried in the ground, and where a connection must be made with this buried line to bring current to a surface electric fixture, junction or joint boxes are employed for encasing the connected ends of the several wires and these boxes are filled with some sealing material which is designed to prevent moisture reaching the joints. However, in spite of the precautions taken of filling the joint boxes with sealing material, the joints do become moist and corroded and short circuits occur, necessitating the taking up of the joint box for replacement. In addition, should any part of the current carrying wire between two joint boxes become damaged, the entire system must stay out of order until the cable and the joint boxes can be dug up so that a new cable can be connected between the boxes or a jump line connected while the damaged portion of the cable is being repaired.

The present invention has for its primary object to overcome the difficulties at present involved in making repairs in systems of the kind described through the provision of a novel type of housing or junction box designed to be disposed upon the surface of the ground at each of the points in the system where a piece of electrical equipment is located, into which the ends of the buried current carrying lines are brought and joined with the wire or cable by which current is carried to the equipment, thus providing means whereby the joints can be kept housed and dry; where they will be readily accessible in the event that the particular piece of equipment adjacent the box is to be disconnected from the line and whereby a jump wire may be quickly connected between two junction boxes to keep the system operating, in the event that damage is done to the buried line between the boxes.

Another object of the invention is to provide an improved junction box having novel means associated therewith whereby any moisture entering the same will be kept away from the wires leading thereinto and may be drained away.

A still further object of the invention is to provide a novel means of joining together several line wires in the junction box.

The invention will be best understood from a consideration of the following detailed description taken in connection with the accompanying drawing forming part of the specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in perspective of the structure embodying the present invention showing the same housing a transformer with which the line wires and the equipment serving wires are connected;

Figure 2 is a perspective view similar to Figure 1 but showing the manner in which the line wires and the equipment serving wires are directly connected in the box;

Figure 3 illustrates the manner in which the junction box is located upon the surface of the ground adjacent a supporting standard for a piece of electrical equipment.

Referring to the drawing wherein like numeral of reference designate corresponding parts throughout the views, the numeral 1 indicates generally the body of the present junction box which is here shown as being of rectangular outline but which obviously may be of any desired form. One side of this box is open for access to the interior and this open side is normally closed by the hinged door 2, the supporting hinges for which are indicated by the numeral 19. Supporting feet 3 are secured to the bottom of the housing or box by the screws 21 so that the box will be supported clearly of the ground and a sufficient area will be left therebeneath to permit free drainage from the interior of the box of any moisture which may enter the same while the door 2 is open for the making of repairs or replacements.

Within the box is a partition or shelf 4 through which are a series of small openings which are indicated by the numerals 17, and two larger openings which are indicated by the numerals 18, and the bottom wall of the box is provided with two threaded openings 26, each of which is directly beneath an opening 18 of the partition or shelf while the opposite side walls are each provided with a threaded opening 7 which is in the same transverse vertical plane as the openings 18 and 26. The bottom wall of the box also has a drain opening 20 which is preferably placed at the center of the box and this is covered by a wire screen of any suitable character to prevent the entrance of insects into the box.

Where the junction box receives the adjacent ends of underground electric cables such as are indicated by the numerals 9, there is provided a novel form of lead-in elbow indicated by the numeral 5, one end of which is threaded for engagement in an aperture 26. The lower part of each elbow is located within the ground and the end of a cable 9 extends thereinto and is guided upwardly thereby through the opening 26 and through the overlying opening 18 in the shelf or partition 4. In order to prevent moisture getting down into the elbow 5 from the interior of the box, there is provided a hood 8 of suitable material such as rubber or the like which has a small opening at its apex through which the cable 9 is forced while the base is pressed down against the inner surface of the bottom of the box in the manner illustrated in Figure 1. The other end of each elbow 5 is formed as a bushing which engages about the cable 9.

At the top of the box an opening is formed in which is connected one end of a pipe 14 through which current carrying feed wires may pass to any electric fixture such as is conventionally illustrated and indicated by the numeral 15.

Figure 1 shows the use of the box in connecting the ends of underground cables with the outlet or feed wire running through the pipe 14, as previously explained, and also illustrates how a piece of electrical apparatus such as a transformer, indicated by the numeral 16, may be placed in the box and connections made between it and the lead-in current cables 9 by means of the covered slip connections 10 and 11, and this figure also illustrates how the outlet side of the transformer or secondary may be coupled by insulating slip connections 12—13 with the electrical fixture 15. The partition or shelf 4 is preferably of insulation material so as to prevent any possible leakage of electric current from the unit 16 to the walls of the box.

Figure 2 illustrates how the box may be employed for bringing together and coupling the ends of feed wires which are normally disposed above the surface of the ground on which the box rests. When used in this manner, the feed wires which are indicated by the numerals 24, are brought into the box through the side wall openings 7 and at the points where they enter they pass through the nipples 25, each of which has one end threaded and in threaded engagement with the edge of the opening 7 while at its outer end, the bushing 6 described in connection with the elbows 5 is formed. The inner ends of the nipples are covered from within the junction box by the hoods 8 which are slipped over the ends of the cables 24 before the same are connected together.

The numerals 22 and 23 designate a novel slip connection or three-way connection by which the ends of the current carrying lines 24 may be electrically coupled and may have the end of a feed cable 27 electrically coupled therewith for carrying current to the fixture 15.

It will, of course, be understood that when the elbows 5 are used, as illustrated in Figure 1, suitable means may be employed for closing the openings 7 and this same closing means may be used to close the openings 26 when the nipples 25 are engaged in the openings 7.

From the foregoing, it will be readily apparent that by using a junction box of the character herein described in connection with lighting systems of the character referred to, the connections between the main current carrying lines and the lead-off lines may be easily and quickly reached when it is necessary that any work be done in connection with the same. It will also be apparent that where the junction boxes are employed in systems in which the current carrying cables are buried in the ground, should any damage be done to the underground cables, a jump line may be quickly put in place between two junction boxes so that the system can be kept in operation while the damaged cable is dug up for repair or replacement. It will thus be seen that with the present invention in use in outdoor systems, the length of time that the system need be out of order in case of trouble can be materially shortened over the time when the system would remain out of order if the junction or joint boxes were buried in the ground when damage occurs.

While the present invention is illustrated as being placed upon the surface of the ground, it will be apparent that it can also be installed in concrete or in any other suitable location and that it provides improved facilities for servicing whether used above ground, in concrete conduits or in connection with buried cables.

What is claimed is:—

1. An electric junction box, comprising a casing having a wall door providing access to the interior, each of two walls of the casing having a threaded aperture therethrough, a partition shelf of insulation material within the casing, a pair of tubular bodies each adapted to be threadably engaged at one end in a threaded aperture, means forming a lead-off for a current carrying line leading out of the casing, and a pair of conical centrally apertured hoods each adapted to cover one of said threaded openings upon and bear against the inside of the casing wall and to encircle and snugly engage a current carrying line entering through the aperture.

2. An electric junction box, comprising a casing, a door closing one side thereof, a horizontal shelf partition disposed in the lower part of the casing and having three of its four edges secured to a wall of the casing, the fourth one of said edges being set-in a substantial distance from said door, said partition having drain apertures therethrough, the wall of the casing beneath the partition having a screened drain aperture, a pair of cable shielding conduits, each connected with and opening through the wall of the casing beneath said partition, and a pair of guard units of insulation material in the casing and each covering the open end of a conduit and having a restricted opening for the close engagement of the unit with a cable passing therethrough.

VICTOR A. LA FAVE.